Figure 1:
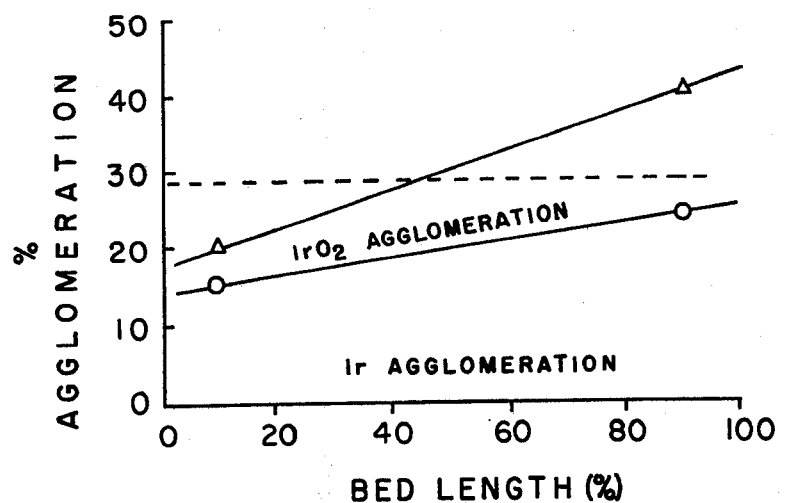

United States Patent [19]

Paynter et al.

[11] 3,939,061

[45] Feb. 17, 1976

[54] PROCESS FOR REACTIVATION OF IRIDIUM-CONTAINING CATALYSTS

[75] Inventors: John D. Paynter, Louisville, Ky.; Richard R. Cecil, Mendham, N.J.

[73] Assignee: Exxon Research and Engineering Company, Linden, N.J.

[22] Filed: Aug. 16, 1973

[21] Appl. No.: 388,741

[52] U.S. Cl............................. 208/140; 252/415
[51] Int. Cl.$^2$................ C10G 35/08; B01J 23/96
[58] Field of Search...................... 252/415; 208/140

[56] References Cited
UNITED STATES PATENTS

| | | | |
|---|---|---|---|
| 2,880,168 | 3/1959 | Feller................................. | 208/140 |
| 2,980,631 | 4/1961 | Craig et al. ....................... | 208/139 |
| 3,134,732 | 5/1964 | Kearby et al. .................... | 208/140 |
| 3,554,902 | 1/1971 | Buss.................................. | 208/139 |
| 3,578,583 | 5/1971 | Buss.................................. | 208/139 |
| 3,625,860 | 12/1971 | Condrasky......................... | 252/415 |
| 3,637,524 | 1/1972 | Johnson et al................... | 252/415 |
| 3,673,109 | 6/1972 | Georgescu et al................ | 252/415 |
| 3,684,693 | 8/1972 | Sinfelt.............................. | 208/138 |
| 3,707,509 | 12/1972 | Georgescu et al................ | 208/139 |
| 3,764,557 | 10/1973 | Kluksdahl......................... | 252/415 |

*Primary Examiner*—Winston A. Douglas
*Assistant Examiner*—P. E. Konopka
*Attorney, Agent, or Firm*—L. A. Proctor

[57] ABSTRACT

A process for reactivating a catalyst comprising iridium, or iridium as a component of a multimetallic combination, particularly one which includes both iridium and platinum admixed one with the other, and with other metal components, and halogen, composited with a refractory porous inorganic oxide, previously inactivated by coke deposition thereon, possible loss of halogen content and agglomeration of the metal, or metals, or oxides thereof, such as occurs in a reforming process wherein such catalyst is contacted with a hydrocarbon feed at reforming conditions, and subsequently regenerated by burning accumulated coke deposits therefrom. A bed of the coke-depleted catalyst, wherein up to about 70 weight percent of the iridium of the catalyst is present as agglomerates of crystallite sizes greater than about 50A, is contacted in a plurality of cycles, an initial cycle of which includes, in sequence, (i) reduction of the coke-depleted catalyst, as by contact thereof with a stream of reducing gas, e.g., hydrogen or hydrogen-containing gas, at temperature sufficient to reduce the said iridium component, or the iridium component in admixture with other components, and (ii) contact of the reduced catalyst, up to or not significantly beyond the time of halogen breakthrough, with a halogen, or halogen precursor, in the presence of insignificant concentrations of added molecular oxygen, if any, at temperature sufficient to redisperse the agglomerates, and subsequent cycles of which include, in sequence, reduction as defined in step (i), supra, and halogenation as defined in step (ii), supra, whether or not molecular oxygen is added.

22 Claims, 3 Drawing Figures

FIGURE I

PERCENT IRIDIUM AGGLOMERATION IN A SEQUENTIAL TREAT USING, IN A FIRST STEP, A GASEOUS MIXTURE CONTAINING CHLORINE (NO OXYGEN), AND IN A SECOND STEP, A GASEOUS MIXTURE CONTAINING BOTH CHLORINE AND OXYGEN

PROCESS FOR REACTIVATION OF IRIDIUM-CONTAINING CATALYSTS

REFERENCE TO RELATED APPLICATIONS

Reference is made to Application Ser. No. 343,304 by D. J. C. Yates, filed Mar. 21, 1974 (which is a continuation-in-part of Application Ser. No. 248,603 filed Apr. 28, 1972); Application Ser. Nos. 388,742; 388,743; 388,744 by D. J. C. Yates et al, filed Aug. 16, 1973; Application Ser. No. 388,741 by J. D. Paynter et al filed Aug. 16, 1973; Application Ser. No. 388,746 by J. H. Sinfelt et al, filed Aug. 16, 1973; and Application Ser. No. 411,192 by J. H. Sinfelt et al, filed Aug. 16, 1973 (which is a continuation-in-part of Ser. No. 388,746, filed Aug. 16, 1973), all of which relate to the reactivation of iridium-containing catalysts.

Catalytic reforming, or hydroforming, is a type of process well known to the petroleum refining industry, and has been used for improving the octane quality of naphthas and straight run gasolines for many years. In a typical process, a series of reactors, each provided with preheat furnaces, are provided with fixed beds of catalyst. A naphtha feed, with hydrogen, is co-currently passed sequentially through a reheat furnace and then to the preceding reactor of the series. There is net hydrogen production, and the vapor effluent from the last reactor of the series is a gas rich in hydrogen, which usually contains small amounts of normally gaseous hydrocarbons. The hydrogen is separated from the $C_5^+$ liquid product and recycled to the process to inhibit coke formation on the catalyst, though inevitably coke accumulates on the catalyst.

Reforming catalysts are recognized as dual-functional, the catalyst composite including a component comprising a metal, or metals, or a compound or compounds thereof (usually an oxide or sulfide), providing a hydrogenation-dehydrogenation function and an acidic component providing an isomerization function. The platinum group, or Group VIII noble metals (ruthenium, osmium, rhodium, iridium, palladium and platinum), have been recognized as having excellent hydrogenation-dehydrogenation activity and, despite its expense, platinum has been recognized as having a combination of properties which makes it particularly suitable as a hydrogenation-dehydrogenation component for reforming operations. Hence, catalysts utilizing platinum composited with an inorganic oxide base, particularly alumina, have become widely used in commercial reforming operations. More recently, promoters which include other Group VIII noble metals, e.g., iridium, have admixed with platinum. Other metals, such as rhenium, lead, germanium, tin, Group III and rare earth metals, etc., have been added to platinum to enhance one or more of certain of the characteristics which a good reforming catalyst must possess, viz., activity, selectivity, activity maintenance and yield stability. Minor proportions of a halogen, e.g., chlorine, fluorine, bromine and the like, are generally added to enhance the acid function required of such catalysts.

The principal reactions produced by these types of dual-functional catalysts in reforming are: (1) the dehydrogenation of naphthenes to produce the corresponding aromatic hydrocarbons, e.g., methylcyclohexane is dehydrogenated to form toluene, (2) isomerization of n-paraffins to form branched-chained paraffins and isomerization of ring compounds, e.g., the isomerization of ethylcyclopentane to form methylcyclohexane, and dehydrogenation of the latter to from toluene, (3) dehydrocyclization of paraffins to form aromatics, e.g., the dehydrocyclization of n-heptane to form toluene, and (4) hydrocracking of high molecular weight feed constituents to form lower molecular weight, or lower boiling constituents, e.g., the cracking of n-decane to produce $C_3$ and $C_7$ hydrocarbons. The net effect of such reactions is to increase the concentration of aromatics, with consequent octane improvement of naphthas boiling within the gasoline range. An inevitable, though undesirable, reaction is believed to involve (5) polymerization of olefins, with subsequent degradation of the polymeric substances to form coke or carbonaceous materials which deposit on the catalyst, eventually resulting in its inactivation.

In catalytic reforming, the activity of the catalyst thus gradually declines due to a build-up of carbonaceous deposits on the catalyst. During operation, the temperature of the process can be gradually raised to compensate for this activity loss. Eventually, however, economics dictate the necessity of reactivating the so "inactivated" catalyst. The reactivation is normally conducted by swinging one reactor at a time out of series, while reforming is continued in the other reactors of the series, or by shutting down the whole reforming unit and treating all of the catalyst of the several reactors simultaneously prior to returning the reactors to on-stream or on-oil conditions. In either event, reactivation is accomplished in part, as is also known, by subjecting the catalyst to an oxidizing atmosphere to remove the carbonaceous deposits by burning at controlled conditions. The burning step per se, generally referred to as "regeneration," may be conducted in one or more cycles. Often, oxygen concentration at low temperature, e.g., with flame front temperature ranging about 800°–1000°F., followed by a secondary burn with increased oxygen concentrations as coke is depleted from the catalyst. Maximum temperatures range generally no higher than about 1100°F. or 1200°F., but preferably are much less to avoid sintering of the catalyst. Higher temperatures should never be permitted for an extended period. Precise control, however, is difficult and, while incomplete removal of the coke deposits is acceptable in some cases, it is generally preferred to remove substantially all of the burnable coke from the catalyst. Despite the care taken with the burning operation, the activity of the catalyst already lessened, inter alia, by coke accumulation and halogen loss, is further lessened because the metallic components on the catalytic surface are agglomerated, or further agglomerated. Hence, it is prior art practice following the burn period to further treat the catalyst with halogen, e.g., chlorine for the purpose of restoring the desired activity, caused in part by loss of its acid function, and to redisperse the metallic crystallites or agglomerates which have been produced on the catalyst surfaces. In treating with halogen, oxygen is added to speed up the dispersing of the metals.

Platinum group metal catalysts have been long known to deactivate for various reasons, some of which have been specified. Serious loss of activity, however, is due to the tendency of those metals to form larger aggregates, or agglomerates. Thus, as the size of the agglomerates is increased, there results a progressive decline in catalytic activity. X-ray diffraction patterns taken, e.g., on fresh, or carefully reactivated, platinum-on-alumina catalyst thus fail to show any significant lines corresponding to platinum, this indicating that the platinum is present in very finely dispersed or atomic form. X-ray diffraction patterns taken on the same catalyst used in reforming, from which the coke has been burned, not only show the presence of platinum, but also agglomerates of relatively large or massive crystals whose sides (length of a side of an assumed cubic crystallite) are greater than about 50A (Angstrom units) and ranging about 150A, and greater. This is sharply contrasted with the fine state of dispersion of the platinum on most fresh catalysts which is shown by chemisorption techniques to range in average size to a maximum of about 11 or 12A. [For description of chemisorption techniques, refer to *Journal of Catalysis*, 8, 348, 1967 by D. J. C. Yates and J. H. Sinfelt.] Iridium metal not only exhibits similar behavior but, additionally, an acute tendency to agglomerate into large crystallites wherein the oxides are often in admixture with the agglomerated metal on the catalyst surface. The activity of such catalysts is substantially lowered as a result of the loss of metal dispersion on the catalytic surface.

In the treatment of conventional reforming catalysts (i.e., platinum or palladium catalysts), the actual amount of metals agglomeration, once reactivation of a reforming catalyst is necessitated by process economies, is of little, if any, consequence. Thus a bed of the inactive catalyst is simply contacted with a stream comprising a mixture of oxygen (air) and halogen, produced ex situ or in situ, at appropriate treat conditions and the treatment is continued up to the point of halogen breakthrough, at which time the metal is effectively redispersed. At the same time, halogen lost from the catalyst during the conduct of the reforming operation is replaced, effectively restoring the desired acid function of the catalyst. With the iridium-containing catalysts, however, redispersement of the metal, or metals, is exceedingly more difficult and it is the present practice to continue the treatment beyond the point of halogen breakthrough. In commercial operations, however, this is quite onerous because it is desired to minimize the time period that the equipment is exposed to corrosive gases, and the extended time required for the additional treatment is burdensome on the economics of the process. Moreover, it necessitates scrubbing the halogen from the exit or tail gas, e.g., with caustic soda. Halogen thus cannot be vented to the atmosphere, and spent caustic, particularly after halogen absorption, cannot be put in sewers, rivers, or streams. Hence, aside from the additional treat time and added unit corrosion problems, pollution and disposal problems make it undesirable in a commercial operation to treat significantly beyond the time of halogen breakthrough.

Halogen breakthrough, for purposes of the present invention, is defined as that point in time not exceeding about 0.50 hour (one-half hour), preferably not exceeding about 0.25 hour (one-quarter hour), and more preferably is defined as that point in time when the concentration of halogen in the exit gas, or gas from the exit side of the catalyst bed, becomes equal to the concentration of halogen in the inlet gas, or gas introduced into the catalyst bed. When a gaseous mixture which contains halogen is thus introduced into a catalyst bed, a point in time is reached when the concentration of halogen exiting from the tail of the catalyst bed has undergone a relatively rapid rise and has begun to approach the concentration of halogen in the gas being introduced into the entrance of the bed. It is well known that when treating a bed of catalyst with halogen, after a period of time a minute concentration of halogen in the exit gas will appear. After the first appearance of halogen, the concentration, at first slowly, but then rapidly increases until eventually a maximum concentration is reached, at which time the concentration of halogen in the exit gas becomes equal to the concentration of halogen in the inlet gas. This is a typical chromatographic response commonly observed in systems wherein a gaseous component is adsorbed or desorbed on a bed of solids of high surface area. In any event, pursuant to the best mode of practicing the present invention, halogen treatments are discontinued at that point in time when the halogen concentration in the exit gas becomes equal to the halogen concentration of the inlet gas.

Added oxygen, for purposes of the present invention, means oxygen injected or added per se during the reaction, or injected or added with reactants introduced during the reaction, as opposed to the generation or release in situ of oxygen as might occur by transition of the catalyst charge from one form into another.

This invention has as its primary object the improvement of conventional reforming, or hydroforming, processes in that its aim is to obviate the foregoing and other prior art deficiencies.

A particular object of the present invention is to provide a new and novel process for reactivation of catalysts which comprise iridium, or iridium as a component of a multimetallic combination, particularly one which includes both iridium and platinum admixed one with the other, and with other metal components, which become deactivated in reforming operations by contact with hydrocarbon feeds at reforming conditions, inclusive, also of any additional deactivation, if any, as caused by burning coke deposits from such coke fouled catalysts.

A more specific object is to provide a new and novel reactivation process which minimizes the number, kind and duration of treating steps in reactivating catalysts, particularly reforming catalysts, and returning same to a higher state of activation, or state of activation approaching or approximating that of the fresh catalyst.

These objects and others can be achieved in accordance with the present invention wherein it has unexpectedly been discovered that a catalyst, or bed of catalyst, comprising a composite of an iridium metal (or compound thereof) of the Periodic Table of the Elements (E. H. Sargent and Company, Copyright 1962 Dynaslide Company), or mixture of said metal with other metals, particularly platinum, or admixtures of iridium and platinum with other metals halogen and a refractory porous inorganic oxide can be reactivated, after deactivation by coke deposition thereon, possible loss of halogen content and agglomeration of the metal, or metals, such as can occur in a reforming operation, and this can be accomplished without any necessity of treating the catalyst for a period beyond, or significantly beyond, the point of halogen breakthrough. In an initial step, accumulated coke deposits are removed from the catalyst, or bed of catalyst, by burning with an oxygen-containing gas, or gases, at a temperature not substantially in excess of about 850°F., and preferably not in excess of about 775°F. A bed of the coke-depleted catalyst wherein the iridium of the catalyst is agglomerated no more than about seventy weight percent to crystallites having sides (assumed cubic crystallite) greater than about 50A, is contacted in a plurality of cycles, an initial cycle of which includes, in sequence, (i) contact of the coke-depleted catalyst with a reducing gas, preferably a stream of hydrogen or hydrogen-containing gas, at temperature and time sufficient to reduce a substantial portion of the iridium, an (ii) contact of the reduced catalyst, up to but not substantially exceeding halogen breakthrough, with a gas comprising halogen, or halogen precursor, which does not include significant concentrations of added molecular oxygen, if any, at temperature sufficient to redisperse the agglomerates and reduce their average crystallite size, and subsequent cycles of which include, in sequence, reduction as defined in step (i), supra, and halogenation as defined in step (ii), supra, whether or not molecular oxygen is added. Preferably, after the redispersion, the metal, or metals, of the catalyst, inclusive of iridium, is atomically dispersed, or the average size of the crystallites after redispersing are no more than about 12A, and preferably no more than about 5 percent of the iridium is present in the catalyst as agglomerates of a crystallite size ranging above about 50A.

In effecting the coke-burn, it is desirable that the concentration of oxygen, the temperature, and time of contact are insufficient to completely agglomerate the metal, or metals, of the catalyst. Preferably, the temperature of the burn should not be permitted to exceed about 850°F., more preferably 750°F., and the oxygen concentration and time of contact with a bed of catalyst are controlled such that not more than about seventy weight percent of the iridium on said catalyst is agglomerated to crystallite sizes greater than about 50A. After the coke burn and prior to reduction, it is essential that the coke depleted catalyst not be contacted with a substantially halogen-free, oxygen-containing gas at temperatures in excess of those employed in the burning operation.

It is also essential that the coke-depleted catalyst, after reduction in any given cycle, not be contacted with a substantially halogen-free, oxygen-containing gas at a temperature sufficient to agglomerate further the iridium on the catalyst prior to a halogen redispersal step. In effecting redispersion of the metal, or metals, of the catalyst during halogen treatment, it is necessary to maintain the halogen, or halogen-containing gas, at a temperature of at least about 850°F. to obtain significant redispersion.

The present invention has particular utility in the reactivation of partially agglomerated oxygen-sensitive, iridium-containing reforming catalysts. While the most common of the platinum group metals, e.g., platinum or palladium, particularly the former which is widely used in commercial reforming, can be effectively dispersed to a highly active state by treatment of a bed of the catalyst with halogen, to the point of halogen breakthrough, in an oxxidizing atmosphere, this is not the case with iridium catalysts. Thus, in dispersing platinum, the amount of oxygen contained in the halogen treat gas is not at all critical and, in fact, the oxygen has a beneficial effect in increasing the rate of dispersion of the metals. Moreover, in treating a bed of the catalyst in a singular continued contact to the point of halogen breakthrough, the catalyst is generally returned to its original state of activity. With inactivated iridium catalysts, e.g., platinum-iridium catalysts, however, the prior art method of treating with halogen and air immediately after an oxidizing treatment results in very little reactivation even when a bed of the catalyst is treated long past the point of halogen breakthrough. Only a very small decrease in overall crystallite size of the agglomerates is obtained. The crystallite size of the metal is not reduced generally to the crystallite size existing in the initial catalyst prior to use, unless the amount of oxygen present with the halide is less than 10 volume percent, and preferably 1 volume percent, and also unless the catalyst is in reduced form at the time of the halogen treatment. For example, when an iridium-on-aluminum catalyst containing a high percentage of large iridium crystallites is treated without reduction with a mixture of one percent chlorine in air for several hours, very little redispersion of the iridium takes place. The presence of large metal crystallites gives catalysts of relatively low activity. However, subsequent to reduction, treatment of the same catalyst in similar manner with a gaseous mixture containing one percent chlorine, and the remainder an inert gas, will give an active catalyst. Even under optimum conditions, however, it is not possible to reactivate the catalyst sufficiently to return it to its original high state of activity unless the catalyst is treated for significantly long periods, generally ranging for several hours in duration.

It has now been discovered, however, that beds of inactivated iridium-containing catalysts can be treated and the catalysts returned to their original high state of activation without extension of the period of treatment beyond the point of halogen breakthrough. The present invention is thus based in part on the discovery, in treating beds of partially agglomerated catalyst of such character with halogen, e.g., chlorine, which contains molecular oxygen even in very low or minute concentration, that damage of the catalyst in some parts of the bed can result at the high treat temperatures which are essential to effectively redisperse the metal, or metals, of the catalyst. For example, when a gas comprising, e.g., one percent chlorine, one percent oxygen and ninety-eight volume percent of an inert gas such as helium is pased through a bed of partially agglomerated catalyst, e.g., platinum-iridium dispersed on an alumina, previously burned in oxygen to remove the coke, and subsequently reduced with hydrogen, the overall or total effect is initially one that is quite damaging to the catalyst. Thus, at an early point in time after introduction of the gaseous mixture, an examination of portions of catalyst taken from different locations throughout a bed, shows that the metals of the catalyst within the bed nearest the location of initial entry of the gas is well dispersed whereas, in sharp contrast, that nearest the location of the exit of the gas is quite severely agglomerated. As time passes, it is found with continued treatment that the catalyst nearest the location of exit begins to improve but never, at least up to the time of chlorine breakthrough, are the metals thereon as well dispersed as that on the catalyst nearest the location of entry of the gas. Experimentation has shown that the catalyst nearest the location of entry of the gas absorbs most of the chlorine from the gaseous mixture, leaving the gas exit side of the bed exposed to gas which contains relatively low chlorine concentration and, conversely, relatively high oxygen concentration. The result is that in the initial portion of entry of the gas into the bed, the metals of the catalyst are redispersed, while at the other extremity of the bed the metals of the catalyst are not redispersed but, in fact, are generally even more severely agglomerated (higher percentage of iridium present in the form of crystallites that are detectable by x-ray diffraction analysis--greater than 50A (side of an assumed cubic crystallite)) than at the time reactivation was begun.

It is reasoned that this phenomenon occurs because of the high affinity of reforming catalysts for halogen. Halogen uptake is found to be excessively high at the location where the halogen, or halogen-containing, gas is introduced, the halogen clinging tenaciously to the catalyst. The gas in the entry portion of the bed is thus found to be rapidly depleted of halogen and, as the gas containing lower than its initial halogen concentration flows toward the opposite extremity of the bed, there is less halogen uptake by the catalyst. In other words, halogen uptake downstream of the location of entry is lessened as the gas flows through the bed, this creating a halogen concentration gradient throughout the bed, with high halogen concentration at the front end of the bed and low halogen concentration at the opposite end of the bed. The net result is that the catalyst, in a given bed of a reactor, at the location of entry of the halogen-containing gas is always over-halogenated, while the catalyst at the opposite end of the bed is under-halogenated. Considerable time is required to completely redisperse the metals, and hence cause the catalyst to approach its previous or original state of activation. Given sufficiently long treating periods, always well past the time of chlorine breakthrough, the chlorine is found to gradually move to the location of the gas exit as the catalyst in the front portion of the bed becomes sufficiently chlorine-saturated, and some time after the catalyst has absorbed chlorine, the metals begin to redisperse. At the time of chlorine breakthrough at the gas exit side of the bed, however, redispersion of the metals has been effected only in the front part of the bed, while the metals of the catalyst in the rearward part, or gas exit side, of the bed ramain severely agglomerated. The net effect is that the activity of the total catalyst under the best of circumstances may have been somewhat improved but, unless the treatment is continued long past the time of chlorine breakthrough, the activity of the catalyst is far less than that of fresh catalyst.

Continuing this study, it was found that if a partially agglomerated catalyst, pre-reduced with hydrogen, were contacted with chlorine (i.e., one containing no oxygen) then the additional damage to the catalyst at the exit side of the bed did not occur, and that continued contact with chlorine to the time of chlorine breakthrough did, in fact, result in overall reactivation of the catalyst. It was also found that repetitive cycles of treatment with hydrogen and chlorine, continued to the time of chlorine breakthrough, would progressively increase the activity of the catalyst causing it to very closely approach that of fresh catalyst. The reasons for the beneficial effect of a subsequent hydrogen reduction of the catalyst, and subsequent chlorination (i.e., a second or additional cycle, or cycles) are not too well understood. It is believed, however, that the hydrogen reduction returns the metals to their original reduced or metallic state (as opposed, e.g., to an iridium chloride, or chlorides, and/or iridium oxide, or oxides) in which state the metal is more receptive to being dispersed by the chlorine treat. In any event, it is known that the subsequent hydrogen treat does not damage or reinactivate the activated catalyst at the front of the bed. The net effect of the cyclic treatment is that upon reintroduction of the chlorine, after the hydrogen treatment, the metal, or metals, on the inactivated catalyst at the rear of the bed is dispersed, the activity of the catalyst at the point of chlorine breakthrough on completion of repetitive cycles generally closely approaching that of fresh catalyst. In practical commercial operations, it is found that partially agglomerated catalyst can be, in most cases, substantially completely regenerated after only two cycles of hydrogen-chlorine treat applications.

REGENERATION

An essential step in the practice of the present process is to remove coke or carbonaceous deposits from coke fouled catalyst, such as typically occurs in reforming wherein the reforming catalyst becomes fouled with coke or carbonaceous deposits. In initiating regeneration in a reforming process, one or the series of reactors is shut down, and the reactor, or reactors, is purged to remove reactive vapors, and the regeneration is accomplished in situ or ex situ.

A reactor (constituting a reaction zone) containing a bed of the catalyst, the latter having reached an objectionable degree of deactivation due to coke deposition thereon, is first purged of hydrocarbon vapors with a nonreactive or inert gas, e.g., helium, nitrogen, or flue gas. The coke or carbonaceous deposits are then burned from the catalyst by contact with an oxygen-containing gas at controlled conditions, that is, the burning temperature and treatment duration is controlled to avoid converting more than about 70 wt. % of the catalyst iridium to agglomerates having crystallite sizes greater than about 50A. Desirably, the burning operation is conducted at temperatures generally below about 850°F., and preferably below about 750°F. The temperature of the burn is controlled by controlling the oxygen concentration and inlet gas temperature, this taking into consideration, of course, the amount of coke to be burned and the time desired in order to complete the burn. Typically, the catalyst is treated with a gas having an oxygen partial pressure of at least about 0.1 psi (pounds per square inch), and preferably in the range of about 0.3 psi to about 2.0 psi, to provide a temperature ranging from 575°F. to about 850°F for a time sufficient to remove the coke deposits. Coke burn-off can be accomplished by first introducing only enough oxygen to initiate the burn while maintaining a temperature on the low side of this range, and gradually increasing the temperature as the flame front is advanced by additional oxygen injection until the temperature has reached optimum. Most of the coke can be readily removed in this way. For example, a catalyst obtained from a conventional reforming operation typically containing from about 1 to 20 weight percent of coke deposited thereon, based on total catalyst, can be depleted of coke in this manner. Generally, the amount of coke can be reduced to as little as about 0.1 weight percent with oxygen partial pressures such as described, requiring generally from about 0.1 to about 48 hours, and preferably from about 0.5 to about 20 hours.

In accordance with the best mode of practicing the present invention, at least two, and generally up to about five, or more, cycles of sequential hydrogen reduction and halogenation treatment are required to reactivate the reforming catalysts to their original state of activity, or activity approaching that of fresh catalyst after coke or carbonaceous deposits have been burned from the catalyst. Preferably, from 2 to about 3 cycles of sequential hydrogen reduction and halogenation treatment are employed, after carbon burn-off, in treating partially agglomerated catalysts resulting from typical hydrocarbon conversion process operations. The process of the present invention can, in any event, be properly regarded as a process in itself useful for reactivation of coke-fouled, halogen-depleted, partially agglomerated catalysts from any source, particularly hydrocarbon conversion processes, and more particularly coke-fouled, hydrogen-depleted, partially agglomerated iridium catalysts.

REDUCTION

After the coke burn-off step, oxygen is purged from the reaction zone by introduction of a nonreactive or inert gas, e.g., nitrogen, helium, or flue gas, to eliminate the hazard of a chance explosive combination of hydrogen and oxygen. A reducing gas, particularly hydrogen or a hydrogen-containing gas, generated in situ or ex situ, it thus first introduced into the reaction zone and contacted with the coke-depleted catalyst, prior to contact with a substantially halogen-free, oxygen-containing gas at a temperature sufficient to agglomerate further the iridium on said catalyst, at temperature ranging from about 400°F. to about 1100°F., and preferably from about 650°F. to about 950°F., sufficient to effect reduction of a substantial portion of the metal hydrogenation-dehydrogenation component, or components, contained on the catalysts. Pressures are not critical, but typically range between about 5 psig to about 100 psig. Suitably, the gas employed comprises from about 0.5 to about 50 percent hydrogen, with the balance of the gas being substantially nonreactive or inert. Pure, or essentially pure, hydrogen is, of course, suitable but is quite expensive and therefore need not be used. The concentration of the hydrogen in the treating gas and the necessary duration of such treatment, and temperature of treatment, are interrelated, but generally the time of treating the catalyst with a gaseous mixture such as described ranges from about 0.1 hour to about 48 hours, and preferably from about 0.5 hours to about 24 hours, at the more preferred temperatures.

HALOGENATION

Prior to introduction of halogen, hydrogen may be purged from the reaction zone, if desired, suitably by use of a nonreactive or inert gas such as helium, nitrogen or flue gas. The halogenation step is then carried out by injecting halogen, or a halogen component which will decompose in situ and liberate halogen, e.g., chlorine, bromine, fluorine or iodine, in the desired quantities, into the reaction zone and into contact with the reduced catalyst. The gas is generally introduced as halogen, or halogen-containing gaseous mixture, into the reforming zone and into contact with the reduced catalyst at temperature ranging from about 850°F. to about 1150°F., and preferably from about 900°F. to about 1000°F. The introduction may be continued up to the point of halogen breakthrough. The concentration of halogen is not critical, and can range, e.g., from a few parts per million to essentially pure halogen gas. Suitably, the halogen, e.g., chlorine, is introduced in a gaseous mixture wherein the halogen is contained in concentration ranging from about 0.01 mole percent to about 10 mole percent, and preferably from about 0.1 mole percent to about 3 mole percent.

The presence of any oxygen in the halogen treat gas generally complicates the process because of the necessity to purge out the oxygen for safety reasons prior to the intermittent introduction of hydrogen. In addition, the presence of any oxygen decreses the effectiveness of the regeneration when treating up to the point of halogen breakthrough, particularly during the initial cycle of treatment. Redispersion is nonetheless possible, even during the initial cycle of treatment, in the presence of a small amount of oxygen, but the effectiveness of the redispersion is decreased in proportion to the amount of oxygen that is present. It is found, in treating a bed of catalyst beyond the point of halogen breakthrough, however, that once essentially all of the catalyst constituting the bed has absorbed sufficient halogen, little or no damage is subsequently done by an added treat with an oxygen-containing halogen treat gas. It has thus been found that the presence of the halogen protects the catalyst from further damage by contact with oxygen at the relatively high temperature required for the treatment. Hence, oxygen present in the treat gas will not damage already halogenated catalyst but it will have some adverse effect on catalyst that is not halogenated, an inevitable state when treating only to the point of halogen breakthrough. This means, therefore, that the presence of oxygen in the halogen treat gas will be more damaging to the catalyst in the tail of the reactor during an initial treat than in a subsequent treat. Conversely, this means that the presence of oxygen in the halogen treat gas will be less damaging to the catalyst in the tail of the reactor in a subsequent treat vis-a-vis an initial treat because halogen previously absorbed by the catalyst will protect the catalyst from the oxygen exposure. Hence, it is desirable to essentially completely exclude oxygen during the first cycle of halogen treatment of the catalyst. In subsequent cycles of treatment with halogen, however, due to the passivating effect of the first cycle of treatment with halogen, the presence of oxygen becomes less damaging to the catalyst and its presence can be tolerated to a greater degree. Therefore, oxygen can be tolerated in the second and subsequent cycles of treatment of the catalyst with halogen, and in certain situations a small amount of oxygen may be deliberately added with the halogen.

The purpose of the hydrogen treat is to reduce the metal hydrogenation-dehydrogenation component, or components, to its metallic state. Subsequent halogenation treatment will then more effectively disperse the metals. The purpose of the halogenation treatment, on the other hand, is to reduce the average crystallite size of the hydrogenation-dehydrogenation component of the catalyst, i.e., the iridium or admixture of iridium with other metal components which, during a reforming and regeneration series, usually increases in size (size of an assumed cubic crystallite) to a value greater than 50A, and often to sizes ranging about 150A and higher, in which state the catalyst becomes at least sufficiently inactive to be uneconomically attractive for further use without reactivation. To restore fresh catalyst activity, the portion of the iridium that exists as large iridium or iridium oxide agglomerates must be dispersed to a crystallite size less than about 50A, and preferably to crystallite sizes down in the 11 and 12A range, which approximates the metal crystallite size of fresh catalyst, which contains essentially atomically dispersed metal.

Suitable halogen-containing materials for the purpose of this invention include free halogen, e.g., chlorine, bromine, fluorine, iodine, and the like, and including the hydrogen halides, e.g., hydrogen chloride and halide precursors, e.g., halogen compounds of the type which readily decompose in situ to liberate halogen. Preferred halogen-containing compounds include organic halides such as alkyl and aryl mono- and polyhalides, as well as halogenated acids, aldehydes, ketones, etc. Suitable alkyl halides, for example, include methyl chloride, ethyl bromide, methyl chloroform, carbon tetrachloride, etc., or a trihalide, e.g., chloroform, tertiary butyl chloride, or other polyhalide compounds such as perchloroethane, and the like.

Figure 2:
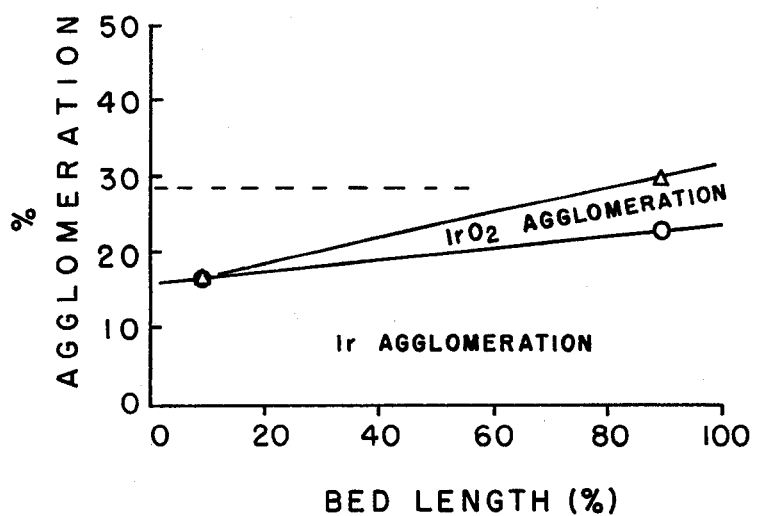
Figure 3:
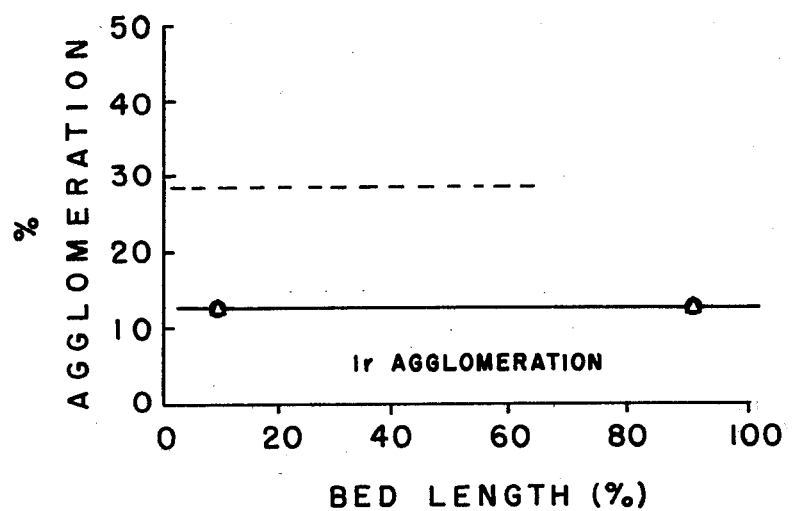

Data providing an experimental basis leading to the discovery of the present invention are illustrated in the accompanying drawings, reference being made to FIGS. 1 through 3 which describe a series of simple treats of partially damaged iridium-containing catalysts, i.e., a mixture of platinum and iridium-on-alumina as partially damaged in a reforming operation to the extent that the catalyst initially contains, after carbon burn-off, a fairly uniform amount of the iridium as large metal crystals having sides (assumed cubic crystallite) greater than 50A. This initial condition of the catalyst is described in these figures as a straight horizontal line (a dotted line) plotted on a graph, the vertical axis of which represents the percentage of the catalytic metals present as large crystallites (percent agglomeration) and the horizontal axis of which represents the relative distance from the entry side to the exit side of the catalyst bed. The gas entry section at the leading edge of the bed is taken as zero percent, the gas exit section at the trailing edge of the bed is taken as 100 percent, points in between representing their respective location on the gradient ranging between 0 and 100 percent. Solid lines plotted on the graphs represent iridium and iridium oxide agglomeration, respectively, these defining treats of a bed of the partially damaged catalyst (previously reduced in a 100 percent stream of hydrogen for 8 hours at 700°–900°F.) treated to halogen breakthrough at 930°F., 100 psig and at a flow rate of 25.3 SCF/Hr. with gaseous mixtures containing chlorine or both chlorine and oxygen, viz., 0.13 mole percent chlorine or 0.13 mole percent chlorine and 0.13 mole percent oxygen, the balance of the gaseous mixtures being nitrogen.

Referring specifically to FIG. 1, there is shown a plot of percent iridium agglomeration on the vertical axis vs. percent of bed length on the horizontal axis, the initial state of the catalyst being described by the dotted horizontal line as one having on the order of about 28 percent of the iridium as crystals greater than 50A. The activity of this catalyst is about 25 percent less than that of fresh catalyst. The solid lines on the graph depict the changed condition of the catalyst as is obtained on once-through treating for 33 minutes with a gaseous mixture of chlorine and oxygen (0.13 M%/0.3M%), at which time breakthrough of chlorine occurs. The plot shows two solid lines for iridium agglomeration and iridium oxide agglomeration, as is determined from analysis by x-ray, which can reveal large crystallites of both iridium metal and iridium oxide, both forms of which are present after coke burn-off and resultant partial damage. The indicator of the total damage of the catalyst is the sum of the areas in between the two curves or, in other words, the total area below the upper solid line. The two lines distinguish the iridium and iridium oxide agglomeration components of the total large iridium present on the catalyst surface.

The data shown on the graph are thus as follows:

| | | Percent Iridium Agglomeration in Treating to Breakthrough with Chlorine-Oxygen Mixture | | |
|---|---|---|---|---|
| | Prior to Treat | Entry | Middle of Bed | Exit Side of Bed |
| Iridium Agglomeration, % | 28 | 15 | 19 | 24 |
| Iridium Oxide Agglomeration, % | — | 5 | 15 | 15 |
| Total Agglomeration, % | 28 | 20 | 34 | 39 |

These results show that the front portion of the bed is reduced in total agglomeration by a factor of about 30 percent. In other words, 15 to 20 percent catalyst damage is shown in the first part of the bed as compared to 28 percent at the start. This, of course, represents a considerable improvement in the front portion of the bed. However, in the back of the bed it will be observed that the total agglomeration is actually greater than 28 percent, this indicating that the treat to the point of breakthrough does not redisperse the iridium contained on the catalyst in that portion of the bed, but rather increases the damage at the tail of the reactor. This shows that a commercial procedure limited to a single cycle of treatment up to the point of chlorine breakthrough cannot accomplish complete redispersion of the iridium.

The catalyst at the front of the bed thus picks up and holds chlorine very tenaciously, and the gas which passes through the reactor to the exit side of the bed is primarily oxygen, particularly at the beginning of the treat. The oxygen alone in the tail of the reactor, being at a high temperature, it has been found, causes further agglomeration to occur even though at the same time the front portion of the bed is being partially redispersed by the action of the chlorine.

By specific reference to FIG. 2, there is shown the results of a run wherein (1) the bed is treated to breakthrough with a 0.13 mole percent mixture of chlorine in nitrogen and (2) the treat is continued with a mixture of 0.13 mole percent chlorine-0.13 mole percent oxygen, in nitrogen, for an additional thirty-three minutes. In this run, the time of exposure to oxygen is identical to the run described in FIG. 1 except in this case the catalyst is chlorinated in the absence of oxygen prior to any oxygen exposure. Other conditions were identical to that described in FIG. 1.

The data shown on the graph are thus as follows:

| | | Percent Iridium Agglomeration in a Sequential Treatment using, in a First Step, a Gaseous Mixture Containing Chlorine (No Oxygen) and, in a Second Step, a Gaseous Mixture Containing both Chlorine and Oxygen. | | |
|---|---|---|---|---|
| | | After Treat | | |
| | Prior to Treat | Entry | Middle of Bed | Exit Side of Bed |
| Iridium Agglomeration | 28 | 16 | — | 22 |
| Iridium Oxide Agglomeration | — | 0 | — | 7 |
| Total Agglomeration | 28 | 16 | — | 29 |

The results clearly show that the chlorine redisperses the metal in the bed entry without causing additional agglomeration at the back part of the bed. One observes that even the catalyst at the back or exit side of the bed, after exposure to oxygen, is at least partially protected from the aforementioned oxygen-induced agglomeration. This, of course, is sharply contrasted with the result shown in FIG. 1 wherein the back portion of the bed is severely agglomerated, more so than the starting material. This proves that chlorine in the absence of oxygen will passivate and protect the catalyst from subsequent oxygen exposure.

Next, referring specifically to FIG. 3, there is shown a treat in which the catalyst is first pre-reduced with hydrogen and then treated only to the point of chlorine breakthrough with a gas containing only chlorine and nitrogen, in a single cycle. Thus, a gas consisting of 0.13 mole percent chlorine in nitrogen is contacted with partially agglomerated catalyst, as previously described. Or, in other words, the demonstration of FIG. 2 is repeated, the second contact or treatment with a mixture of chlorine and oxygen being omitted. The conditions of operation are the same as in the preceding. The catalyst in this case is not exposed to oxygen, and the resulting back-agglomeration occurring in the tail ends of the beds, which produce iridium oxide agglomeration, as shown, is thus eliminated.

The data shown on the graph are as follows:

| | Percent Iridium Agglomeration in Treating to Breakthrough with Chlorine (No Oxygen) | | | |
|---|---|---|---|---|
| | Prior to Treat | After Treat | | |
| | | Entry | Middle of Bed | Exit Side of Bed |
| Iridium Agglomeration | 28 | 13 | — | 13 |
| Iridium Oxide Agglomeration | — | 0 | — | 0 |
| Total Agglomeration | 28 | 13 | — | 13 |

These data thus show that the partially agglomerated catalyst at the exit side of the bed is damaged by oxygen at treat conditions, in treating to the point of halogen breakthrough, albeit some improvement in activity does occur at the entrance of the bed where the metal is effectively redispersed. It is also shown that an initial halogen treatment, wherein no oxygen is present, will not cause additional metals agglomeration at the exit side of the bed in treating the catalyst to the point of halogen breakthrough, albeit the single cycle treatment does not reactivate the catalyst sufficiently to restore the full activity of the catalyst. An initial halogen treatment passivates and protects the catalyst such that subsequent exposure to oxygen is less harmful than an initial exposure to oxygen of a catalyst which has not been halogen treated.

In order to achieve the full benefits of this invention, it is essential to treat iridium-containing catalysts, including especially platinum-iridium catalysts, in a plurality of cycles, an initial cycle of which includes, in sequence, reduction of a partially agglomerated, coke-depleted catalyst, preferably with hydrogen or a hydrogen-containing gas, at temperatures sufficient to reduce the metal hydrogenation-dehydrogenation component and subsequently, particularly in the initial cycle, to contact the reduced catalyst with a halogen, or halogen precursor, which does not contain any significant amount of molecular oxygen. The catalyst is preferably similarly treated in subsequent cycles except that, due to the passivation effect of halogen injected into the process without any significant amount of added oxygen in the initial cycle, the presence of some oxygen added with the halogen in the subsequent cycle, or cycles, will not too greatly adversely affect the activity of the catalyst and, in some instances, may be utilized to advantage. The invention will thus be more fully understood by reference to the following selected nonlimiting examples and comparative data which illustrate its more salient features.

In order to demonstrate a preferred mode of practicing the present invention, certain selected salient data are set forth hereafter. In preparing for these demonstrations as described by reference to Examples 1 and 2, below, a series of catalysts are prepared by slurrying 1 part of particulate alumina, 24 to 35 mesh average particle size (Tyler), in 4 parts of water. Dilute aqueous solutions containing iridium (as chloro-iridic acid), or a second hydrogenation-dehydrogenation component, e.g., platinum (as chloroplatinic acid), is added and the resultant solution stirred for one hour to assure impregnation. The solids are then separated from the solution by filtration and then dried in a circulating air oven at about 220°F. Portions of the catalyst are then heated to 930°F. in a flowng stream of pure hydrogen. The portions of catalyst, which contain about 0.6 weight percent metal, or metals, as metallic metal, are then cooled, in the absence of air, to ambient conditions. The crystallite size of the hydrogenation-dehydrogenation component, or components, is determined by carbon monoxide adsorption to range ab initio between 11A and 15A.

These several portions of catalyst are then packed as fixed beds in three hydroforming reactors of a series and contacted with a typical virgin naphtha having the following inspections:

| ASTM Distillation | |
|---|---|
| Initial | 194 |
| 10 | 207 |
| 20 | 208 |
| 30 | 212 |
| 40 | 216 |
| 50 | 220 |
| 60 | 225 |
| 70 | 231 |
| 80 | 239 |
| 90 | 252 |
| Final B.P. | 295 |
| Octane No., RON Clear | 58.3 |
| Gravity, °API | 59.7 |
| Sulfur, Wt. Percent | <0.05 ppm |
| Analysis, Vol. Percent | |
| Paraffins | 45 |
| Naphthenes | 48 |
| Aromatics | 7 |

The hydroforming reactors are operated at the following on-oil conditions to produce a $C_5^+$ *liquid gasoline product of* 98–101 RON clear which, from the beginning of the run to the end of the run, lasts for approximately 6 months.

| Major Process Conditions | |
|---|---|
| Temperature, °F. (Average) | 895–920 |
| Pressure, Psig | 225 |
| Space Velocity, W/Hr./W | 2.5 |
| Hydrogen Rate, SCF/Bbl. | 6000–7000 |

At the end of a run, the flow of feed to the unit is discontinued and each of the reactors containing the catalyst beds is purged with nitrogen to remove residual hydrocarbons. The reaction coke, amounting to about 1–2 weight percent based on the total catalyst, is burned from the catalyst in situ by injecting initially about 0.3 volume percent oxygen in nitrogen into each of the reactors and maintaining a temperature of 810°F. flame front temperature, and then over a period of 24–36 hours increasing the oxygen concentration on the gas to 1.0 volume percent oxygen and continuing the burn at a temperature of 750°F. for a total time of 4–6 hours, after which time the catalyst contains a residual of about 0.10 weight percent coke. Each of the reactors is then purged with nitrogen to remove essentially all of the oxygen therefrom. Portions from several beds of coke-depleted catalysts are treated as described in the following examples.

EXAMPLE 1

A 0.6 weight percent iridium-on-alumina catalyst, containing 60 percent of the iridium as agglomerates of iridium and iridium oxide greater than 50A (length of side of an assumed cubic crystallite), contained in separate beds as shown in Table I, is treated in two distinct cycles, a cycle comprising a separate and distinct treatment with a hydrogen gas mixture and a subsequent treatment with a chlorine gas mixture. Thus, the catalyst is first treated with a gaseous mixture of 20 percent hydrogen in nitrogen for 16 hours at 750°F. The hydrogen is then purged from the beds with nitrogen. The beds of reduced catalysts are then treated up to, but not beyond, the point of chlorine breakthrough with a gaseous mixture of 1.5 percent chlorine in nitrogen at 900°F., and the cycle then repeated. The results are given in Table I, below:

TABLE I

| | Percent Agglomeration (Iridium Metal plus Iridium Oxide) | | |
|---|---|---|---|
| | Entry | Middle of Bed | Exit Side of Bed |
| Starting Material | 60 | 60 | 60 |
| After First Cycle | 28 | 33 | 27 |
| After Second Cycle | 0 | 2 | 0 |

The catalyst, when the reactors are returned to on-stream conditions, exhibits substantially the same activity as exhibited by the fresh catalyst.

EXAMPLE 2

A catalyst containing 0.3 percent iridium and 0.3 percent platinum, based on the total weight of the catalyst, x-ray spectroscopy of which shows 28 percent of the total metals as crystallites larger than 50A, is treated for 48 hours in a stream of pure hydrogen at 930°F., 100 psig at a flow rate of 25.3 SCF/Hr. and thereby reduced. The catalyst is then treated for 0.5 hour at otherwise similar conditions with a gaseous mixture of 0.3 mole percent chlorine in nitrogen. X-ray analyses of the catalyst are made after each of two cycles, with the following results, described in Table II.

TABLE II

| | Percent Agglomeration | | |
|---|---|---|---|
| | Entry | Middle of Bed | Exit Side of Bed |
| Starting Material | 28 | 28 | 28 |
| After First Cycle | 12 | 12 | 12 |
| After Second Cycle | 0 | 0 | 0 |

The variables which determine the exact shape of the exit halogen concentration response curve, for purposes of determining halogen breakthrough, are many and include temperature, pressure, catalyst surface area, entrance concentration, gas velocities, and moisture level of the catalyst and gases. Also, physical defects or mechanical faults in the catalyst packing can cause a false response due to gross by-passing or uneven distribution of part of the gas flow. However, regardless of these several factors, a period of relatively rapidly increasing concentration of halogen in the exit gases will always occur and, though the first exit of halogen may at best be an irreproducible observation, a point in time will be reached wherein the exit gas will contain a rapidly rising halogen content after which time absorption equilibrium will be reached whereupon the halogen content of the exit gas of a gaseous mixture will equal the halogen content of the inlet gas. Within one-half hour, and generally within one-quarter hour, or less, any agglomerates remaining at or near the exit of the bed will be effectively redispersed.

Catalysts useful in the practice of the present invention are those such as heretofore described, and such as used in hydrocarbon conversion processes, particularly reforming, or hydroforming, processes, e.g., a reforming process wherein a mixture of feedstock and hydrogen-containing gas is passed through a catalyst bed, or beds, where the reforming reactions are carried out at temperatures ranging about 600° to 1050°F., total pressures ranging between about 100 and 1200 psig, hydrogen partial pressures ranging between about 50 and 1000 psi, at hydrogen rates ranging about 1000 to 10,000 SCF/B of feedstock, and an hourly weight space velocity between about 0.5 and 10. Within these ranges of conditions, the satisfactory catalyst life before regeneration or reactivation becomes necessary is dictated by economics and is variable with the severity of the imposed reforming conditions. Under mild conditions, the catalyst can function for months without serious decline in properties, while under more severe conditions, especially at lower hydrogen partial pressures, the satisfactory catalyst life per cycle can be as little as a few days.

The metal hydrogenation-dehydrogenation component, or components, is composited with a suitable base, and is employed in concentration ranging preferably from about 0.01 percent to about 10 percent, and more preferably from about 0.1 percent to about 5 percent, based on the total weight of catalyst composition. The metallic components, where two or more metals are employed, are employed in molar ratios ranging from about 1:10 to about 10:1 and more preferably in molar ratios ranging from about 1:2 to about 2:1, a composition comprising iridium with a second metal, e.g., platinum, in molar ratio of 1:1 having been particularly satisfactory.

The hydrogenation-dehydrogenation component, or components, can be associated or composited with the porous refractory inorganic oxide by various methods known to the art. Where there is more than one component, the several components can be disposed on the porous inorganic oxide in intimate admixture with each other by a suitable technique such as ion exchange, coprecipitation, impregnation, and the like. It is not necessary that the components be incorporated onto the porous inorganic oxide support by the same technique. One component can be composited with the porous inorganic oxide by one method such as, for example, coprecipitation, and the other component associated with the porous inorganic oxide by another technique, i.e., impregnation. Furthermore, the components can be composited with the porous inorganic oxide either sequentially or simultaneously. It is generally preferred that the components be associated with the porous inorganic oxide by impregnation, either sequentially or simultaneously.

The metal, or metals, can be added in essentially any soluble form of the respective metal, or metals, together in the same solution or in sequence as, e.g., soluble salts, acids or other form of compounds. For example, iridium or platinum, or both, can be incorporated with a porous inorganic support in intimate admixture therewith by any suitable technique such as ion exchange, coprecipitation, impregnation, or the like. It is not essential that separate metal components be incorporated onto the porous inorganic oxide by the same technique. One metal, e.g., iridium can be associated with the porous inorganic oxide by one method, e.g., coprecipitation, and the other component, e.g., platinum, by another technique, e.g., impregnation, or vice versa. To incorporate, e.g., platinum onto a porous inorganic oxide support, impregnation with chloroplatinic acid is preferred but other platinum group compounds can be used such as ammonium chloroplatinates, polyamine platinum salts, platinum chloride, and the like. Iridium is also suitably incorporated onto a support with periridic acid, ammonium or potassium salts of iridium, and the like. Other metal promoters, e.g., other Group VIII metal components, tin, tungsten, iron, rhenium, lead, germanium, and the like, can also be incorporated onto a porous inorganic oxide with iridium, or iridium and platinum, in similar manner.

Suitably, mildly or moderately acidic refractory oxides are employed as supports, e.g., silica, silica alumina, magnesia, thoria, boria, titania, zirconia, various spinels, and the like, including in particular alumina which is preferred. High surface area catalysts, or catalysts having surface areas ranging upwardly from about 50 square meters per gram (B.E.T. Method) are preferred. In particular, catalysts having surface areas ranging from about 100 to about 250 square meters per gram, and higher, prove quite satisfactory.

In formation of the more active catalysts, refractory inorganic oxides of desired particle size distribution, in dry state, can be contacted, admixed, or otherwise incorporated with a metal-containing solution, or solutions, and thereby impregnated. The refractory inorganic oxide can thus be pilled, pelleted, beaded, or extruded, alone or in admixture with other materials, and dried and crushed to form particles of desired size ranging, e.g., from about 0.1 to about 0.4 inch, and preferably from about 0.2 to about 0.3, average diameter. The material can then be treated by contact with a solution containing the desired amount of metal, or metals, or treated sequentially by contact with a solution containing one metal and then the other, in the desired amounts. On the other hand, larger particles can be so-treated and then crushed to the desired size. The particulate mass, in either instance, can be dried and calcined, and contacted with hydrogen, generated in situ or ex situ, to reduce the salt. Suitably, also, the catalyst composite can be formed by adding together suitable reagents such as salts of a metal, or metals, and ammonium hydroxide or ammonium carbonate, and a salt of alumina such as aluminum chloride and aluminum sulfate to form aluminum hydroxide. The aluminum hydroxide containing the salts of the metal, or metals, can then be heated, dried, and simultaneously converted to alumina and/or further impregnated with a metal, or metals, if desired. The material can then be calcined and then hydrogen-treated, in situ or ex situ, to reduce the salts and complete the formation of the catalyst composite.

Essentially any petroleum or hydrocarbon fraction containing paraffins, naphthenes, and the like, can be reformed and the catalyst regenerated. A suitable feed, e.g., a naphtha, either virgin or cracked, Fischer-Tropsch or mixtures thereof, is contacted at reforming conditions in the presence of hydrogen with a catalyst composite including the support which contains catalytically active amounts of iridium or admixtures of iridium and platinum, or iridium with other metals, including particularly mixtures of such metals with other metals. Typical feed stream hydrocarbon molecules are those containing from about 5 to about 12 carbon atoms, or more preferably from about 7 to about 9 carbon atoms. Naphthas, or petroleum fractions boiling within the range of from about 80°F. to about 450°F., and preferably from about 125°F. to about 375°F., contain hydrocarbons of carbon numbers within these ranges. Typical fractions thus usually contain from about 20 to about 80 volume percent of paraffins, both normal and branched, which fall in the range of about $C_5$ to $C_{12}$, and 5 through about 20 volume percent of the desirable aromatics falling within the range of from about $C_6$ to $C_{12}$.

It is apparent that various other modifications and changes can be made without departing the spirit and scope of the invention.

Having described the invention, what is claimed is:

1. In a process for the catalytic conversion of hydrocarbons wherein a hydrocarbon feedstock is contacted with a reforming catalyst comprising an iridium hydrogenation-dehydrogenation component composited with a refractory porous inorganic oxide support at conversion conditions, the catalyst having been at least partially deactivated during contact with said feedstock by the deposition of coke deposits thereon, a method for reactivating said catalyst after discontinuing contact of said catalyst with said feedstock comprising:

a. contacting a bed of said catalyst in a reaction zone with a gaseous mixture containing oxygen at an elevated temperature for a time sufficient to burn at least a substantial portion of said coke deposits therefrom, the duration of said contacting at said elevated temperature being insufficient to convert more than about 70 weight percent of the iridium on said catalyst to agglomerates having crystallite sizes greater than about 50A;

b. contacting a bed of said coke depleted catalyst without subsequent contact with a substantially halogen-free, oxygen-containing gas at temperature sufficient to agglomerate further the iridium on said catalyst, in a plurality of cycles, an initial cycle of which includes the steps of i. contacting said coke depleted catalyst in a reaction zone with hydrogen or hydrogen-containing gas at an elevated temperature for a time sufficient to reduce a substantial portion of said iridium on said catalyst to its metallic form;

(ii) contacting said reduced catalyst having a substantial portion of the iridium contained thereon in the metallic form in a reaction zone with a substantially oxygen-free, halogen-containing gas at a temperature of at least about 850°F., continuing said contacting not substantially beyond the point of halogen breakthrough from the exit side of the bed of said catalyst;

and one or more subsequent cycles which includes the steps of iii. contacting said halogen-treated catalyst in a reaction zone with a hydrogen or hydrogen-containing gas at an elevated temperature for a time sufficient to convert a substantial portion of said iridium on said catalyst to its metallic form; and then iv. contacting said catalyst having a substantial portion of the iridium contained thereon in the metallic form in a reaction zone with a halogen-containing gas at a temperature of at least about 850°F., continuing said contacting not substantially beyond the point of halogen breakthrough from the exit side of the bed of said catalyst.

2. The process of claim 1 wherein the hydrogenation-dehydrogenation component is comprised of a mixture of iridium and platinum.

3. The process of claim 1 wherein the catalyst is treated in the sequence of hydrogen reduction and halogenation steps in a series of from about 2 to about 5 cycles.

4. The process of claim 1 wherein the reduction in steps (i) and (iii) is carried out at a temperature ranging from about 400°F. to about 1100°F.

5. The process of claim 4 wherein the temperature ranges from about 650°F. to about 950°F.

6. The process of claim 1 wherein the temperature of halogenation in steps (ii) and (iv) ranges from about 850°F. to about 1150°F.

7. The process of claim 6 wherein the temperature ranges from about 900°F. to about 1000°F.

8. The process of claim 1 wherein the halogen employed in steps (ii) and (iv) is chlorine.

9. The process of claim 1 wherein the halogen employed in steps (ii) and (iv) is introduced as a gaseous mixture wherein the halogen is contained in concentration ranging from about 0.01 mole percent to about 10 mole percent.

10. The process of claim 1 wherein in steps (i) and (iii) the time of contact of the catalyst with the hydrogen or hydrogen-containing gas, to effect reduction of the iridium component of the catalyst, ranges from about 0.1 hour to about 48 hours, and the temperature ranges from about 400°F. to about 1100°F.

11. The process of claim 10 wherein the time of contact between the catalyst and the hydrogen or hydrogen-containing gas ranges from about 0.05 hour to about 24 hours, and the temperature ranges from about 650°F. to about 950°F.

12. The process of claim 9 wherein the concentration of the halogen ranges from about 0.1 mole percent to about 3 mole percent.

13. In a process for the catalytic reforming of hydrocarbons wherein a hydrocarbon feedstock is contacted with a reforming catalyst comprising an iridium hydrogenation dehydrogenation component composited with an alumina support at reforming conditions, the catalyst having been at least partially deactivated during contact with said feedstock by the deposition of coke deposits thereon, a method for reactivating said catalyst after discontinuing contact of said catalyst with said feedstock comprising:

a. contacting a bed of said catalyst in a reaction zone with a gaseous mixture containing oxygen at partial pressures of at least about 0.1 psi at temperatures ranging from 575°F. to about 850°F. for a period ranging from about 0.1 to about 48 hours to burn at least a substantial portion of said coke deposits therefrom, the duration of said contacting at said elevated temperature being insufficient to convert more than about 70 weight percent of the iridium component of said catalyst to agglomerates having crystallite sizes greater than about 50A;

b. contacting a bed of said coke depleted catalyst, without subsequent contacting with a substantially halogen-free, oxygen-containing gas at temperature sufficient to reagglomerate the iridium on said catalyst in a plurality of cycles, an initial cycle of which includes the steps of i. contacting said coke depleted catalyst in a reaction zone with hydrogen or a hydrogen-containing gas at temperature ranging from about 400°F. to about 1100°F. to reduce a substantial portion of said iridium component of said catalyst to its metallic form;

ii. contacting said reduced catalyst having a substantial portion of the iridium contained thereon in the metallic form in a reaction zone with a substantially oxygen-free gas which contains halogen in concentration ranging from about 0.01 mole percent to about 10 mole percent at a temperature of at least about 850°F., continuing said contacting not substantially beyond the point of halogen breakthrough from the exit side of the bed of said catalyst;

and one or more subsequent cycles which includes iii. contacting said halogen-treated catalyst in a reaction zone with a hydrogen or a hydrogen-containing gas at temperature ranging from about 400°F. to about 1100°F. for time sufficient to convert a substantial portion of said iridium component of said catalyst to its metallic form; and then iv. contacting said catalyst having a substantial portion of the iridium contained thereon in the metallic form in a reaction zone with a gas which contains halogen in concentration ranging from about 0.01 mole percent to about 10 mole percent at a temperature of at least about 850°F., continuing said contacting not substantially beyond the point of halogen breakthrough from the exit side of the bed of said catalyst.

14. The process of claim 13 wherein the hydrogenation-dehydrogenation component is comprised of a mixture of iridium and platinum, and the hydrogenation-dehydrogenation component is employed in concentration ranging from about 0.01 percent to about 10 percent.

15. The process of claim 14 wherein the concentration of hydrogenation-dehydrogenation component ranges from about 0.1 to about 5 percent.

16. The process of claim 13 wherein the catalyst is treated in the sequence of hydrogen reduction and halogenation steps in a series of from about two to about five cycles.

17. The process of claim 13 wherein the reduction in steps (i) and (iii) is carried out at temperatures ranging from about 600°F. to about 950°F.

18. The process of claim 13 wherein the temperature of halogenation in steps (ii) and (iv) ranges from about 850°F. to about 1150°F.

19. The process of claim 13 wherein the temperature of halogenation in steps (ii) and (iv) ranges from about 900°F. to about 1000°F.

20. The process of claim 13 wherein the halogen is chlorine.

21. The process of claim 20 wherein the chlorine is provided as a gaseous mixture, and the chlorine contained therein is of concentration ranging from about 0.01 mole percent to about 10 mole percent.

22. The process of Claim 21 wherein the concentration of the chlorine ranges from about 0.1 mole percent to about 3 mole percent.

* * * * *